Nov. 13, 1962

W. L. HURFORD 3,064,075

METHOD OF AND APPARATUS FOR TRANSMISSION OF TELEVISION SIGNALS BY FREQUENCY MODULATION

Filed March 9, 1959

INVENTOR.

WINSLOW L. HURFORD

BY

George T. Craig

ATTORNEY 3,064,075
Patented Nov. 13, 1962

3,064,075

METHOD OF AND APPARATUS FOR TRANSMISSION OF TELEVISION SIGNALS BY FREQUENCY MODULATION

Winslow L. Hurford, Collingswood, N.J., assignor to Radio Corporation of America, a corporation of Delaware Filed Mar. 9, 1959, Ser. No. 798,178
5 Claims. (Cl. 178—5.4)

The present invention relates to the transmission of signals by frequency modulation, and more particularly to the transmission of television signals by frequency modulation. The invention is especially useful in microwave relay systems for improving operation thereof when color television signals are transmitted.

The television composite video signal derived by present day scanning methods occupies a frequency band extending to 6 megacycles. The lowest frequency signal component represents image brightness and may be considered a direct current (D.C.). In addition, the luminance signal representing the gray scale of picture information may change rapidly, giving rise to higher frequency components. The chrominance information of the image is represented by amplitude and phase modulation of a color subcarrier. The frequency of this subcarrier is 3.58 megacycles per second (mc. s.). The color subcarrier actually has a frequency of 3.579545 mc. s. The spectrum of a composite video signal has a peak at 30 c.p.s. and one at 60 c.p.s., which are, respectively, the frame and field frequencies. Also, there is a large peak at 15.75 kylocycles per second (kc. s.) which is the line frequency. The video signal spectrum, therefore, has four peaks occurring at 30 c.p.s., 60 c.p.s., 15.75 kc. s., and 3.58 mc. s.

Prior art systems employed predistortion or preemphasis of such a nature as to attenuate the low frequency components of the video spectrum up to 1 mc. s. or perhaps to 2 mc. s. This predistortion or preemphasis is corrected in the video output of the receiver with a complementary network so that the overall video response is flat. With this type of preemphasis and deemphasis, the high energy low frequency signal components are reduced and the higher frequency color subcarrier components produce an FM deviation which is more nearly centered in the FM passband. The end result is a reduction in the differential phase produced by the system at the carrier frequencies. The most serious defect of the prior art arrangement just discussed is the reduction in the signal-to-hum ratio. The term "differential phase" will be discussed more in detail hereinafter.

Briefly, in accordance with the present invention, the attenuation of the preemphasis is restricted to those frequencies of the television spectrum having the highest levels. More particularly, no attenuation is present at the transmitter for hum frequency components nor for the higher frequency range. The purpose of the arrangement of this invention is to reduce the deviations for certain frequencies so that differential phase distortion of the television signal is reduced and at the same time to avoid the loss of signal-to-hum ratio.

The principal object of the present invention is to provide for the maintenance of a favorable signal-to-hum ratio in a frequency modulation television signal transmission system.

Another object of the invention is to provide for preemphasis and deemphasis in a novel manner.

A further object of the present invention is to provide a microwave delay system for television signals in which signal-to-hum ratio at the receiver is favorably maintained by attenuating signals in the range of from substantially 3 kc. to 300 kc.

Other objects and advantages of the present invention will, of course, become apparent and immediately suggest themselves to those skilled in the art to which the invention is directed from a reading of the following specification in connection with the accompanying drawing in which.

Figure 1:
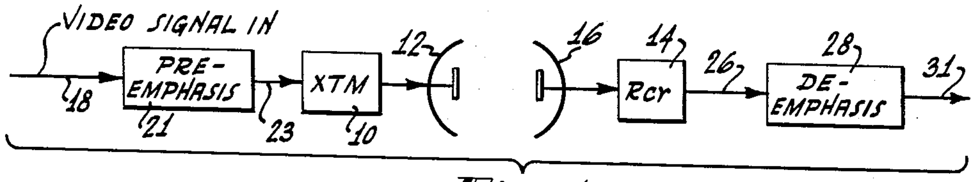
FIG. 1 is a schematic showing of a microwave relay system in which the present invention is particularly applicable.

FIG. 1 of the drawing is a diagrammatic showing of a television FM microwave system of known type, but arranged as indicated to embody the teachings of the present invention. The transmitting portion of the system to the left of FIG. 1 includes a frequency modulation transmitter 10 of any known type which may include a modulated microwave frequency tube such as a klystron feeding a reflecting type antenna 12. The receiver portion of the system shown in FIG. 1 includes a receiver 14 fed in a suitable and known manner by a reflecting antenna 16. It will be understood that the receiver includes intermediate frequency stages and a frequency modulation detector of known type. The composite video signal in the transmitter, which is generated in the usual manner by scanning a live scene, a film or the like, and which is mixed with sync signals, appears in a connection indicated schematically at 18. The video signal is passed to the transmitter by way of a preemphasis network 21, an example of which, in accordance with the present invention, is shown more in detail in FIG. 4 of the drawing. The video signal, after passing through the preemphasis network 21, is applied to the transmitter through a connection indicated schematically at 23. In the receiver portion of FIG. 1, the demodulated component video signal indicated schematically at 26 corresponds to that appearing in the connection 23 with certain modifications which occur as a result of transmission. The received video signal is passed through a deemphasis network 28, an example of which, in accordance with the present invention, is shown more in detail in FIG. 5. The video signal, after correction in the deemphasis network 28, appears in the output connection 31 and corresponds to the video signal input at the transmitter. It will be understood that additional relay links may be included between the antenna 12 and the antenna 16 where extended "multi-hop" service is required. These intermediate links will not be provided with additional pre-emphasis and deemphasis networks since networks constructed in accordance with the teachings of the present invention will provide proper signal restoration.

Figure 2:
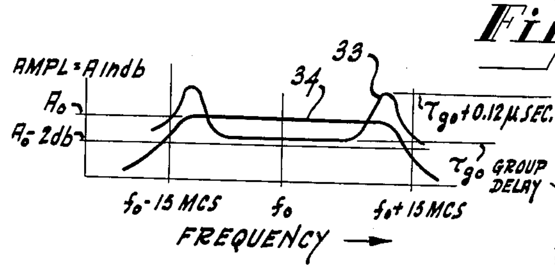
FIG. 2 is a graph showing signal amplitude and group delay plotted against frequency.

In a frequency modulation relay system, such as is shown in FIG. 1 as a setting of the invention, the differential phase varies with the video duty cycle, sometimes referred to as the average picture level when color television signals are transmitted. This variation is the result of several factors. First, the bandwidth of the FM system is necessarily limited and is in general minimum phase in character. It therefore exhibits some group delay error within the passband, which is most pronounced near the band edges. This is illustrated by FIG. 2 of the drawing in which curve 33 represents group delay plotted against frequency. The curve 34 represents amplitude plotted against frequency. The group delay is a characteristic which may be referred to as the $$\frac{d\phi}{d\omega}$$

characteristic. The amplitude against frequency characteristic determines the phase change against frequency characteristic.

Second, when a high frequency component such as the 3.58 megacycle color subcarrier is applied to an FM modulator simultaneously with a low frequency signal component, the effect of the low frequency signal component is to shift the carrier frequency toward one of the band edges. The deviations caused by the high frequency component then appear as frequency modulation of this displaced carrier with sidebands more or less symmetrical about the frequency produced by the action of the low frequency component.

Third, when the sidebands produced by the high frequency component lie in a region of large group delay, $\tau_g$, such as exists near a band edge, they are delayed more than when the same high frequency sideband components are nearly centered in the passband. This delay appears in the detected signal as a shift in the phase of the high frequency component at the extremes of a low frequency voltage swing relative to the phase of the high frequency component near the mean value of the low voltage swing. This is the phenomenon recognized as differential phase. Since differential phase acts, in a color system, to change the hue of an object in a highlight area relative to the hue, say, of another portion of the same object which is in shadow, it is desirable to suppress such effects to the greatest possible extent.

As pointed out in the foregoing, and in accordance with prior art teachings, the entire low frequency portion of the video spectrum was attenuated up to about 1 mc. s. before FM modulation in order to minimize the low frequency carrier swing about which the high frequency deviations appear. This has one severe limitation since the deemphasis which must be applied at the receiver amplifies the low frequency components more than the high frequency components and, in so doing, results in a considerable reduction in the signal-to-hum ratio. This reduction in practice has been so great that it has not been possible simultaneously to meet the performance requirements with regard to differential gain and signal-to-hum ratio.

Figure 3:
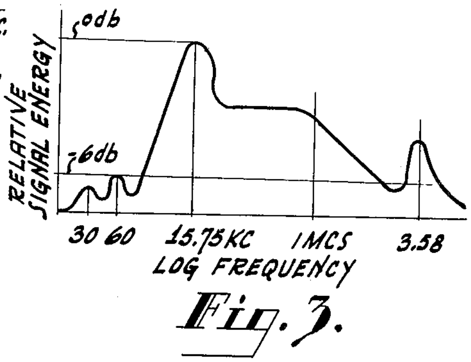
FIG. 3 is a curve showing the characteristics of a composite television signal.

In accordance with the present invention, a simultaneous attainment of the required differential gain and signal-to-hum ratio performance is provided by selection of the preemphasis and deemphasis networks. The preemphasis and deemphasis networks and their use as disclosed herein is governed by the nature of the television video signal. Referring to FIG. 3 of the drawing, a relatively low peak in the spectrum occurs in the vicinity of the frame frequency of 30 c.p.s. There is a higher peak at 60 c.p.s. due to the field frequency. The amplitude of this peak is also contributed to by the vertical blanking pulses and vertical components of shading in the television picture. Another peak occurs at 15,750 c.p.s. due to the horizontal rate blanking. On each side of this peak are sideband components arising from sloping lines and variations in horizontal shading components. There is a broad spectrum of fairly high picture signal energy level extending to about 1 mc. s. Above 1 mc. s. the picture signal energy is reduced at a fairly high rate by the effects of the scanning aperture of the camera tube. Centered about 3.58 mc. s. is the color subcarrier and its sideband components which are of fairly high energy level.

The preemphasis network 21 in accordance with this invention introduces a maximum of 12 decibels (db) of attenuation in the frequency range between half loss points located at 1 kc. s. and at 1 mc. s. The loss is essentially at its maximum value between 3 kc. and 300 kc. and is essentially zero below 300 c.p.s. and above 3 mc. s. The preemphasis network of FIG. 4 thus suppresses the entire high frequency region by 12 db without affecting the region about 60 cycles per second and its first several harmonics or the region containing the color subcarrier and its modulation components. The application of a complementary filter at the receiver does not, therefore, act to emphasize the hum and hence it is possible simultaneously to achieve the desired performance in regard to differential gain and signal-to-hum ratio. The sum of the losses of the two networks, in the illustrative example, is a constant 12 db for all frequencies.

Figure 4:
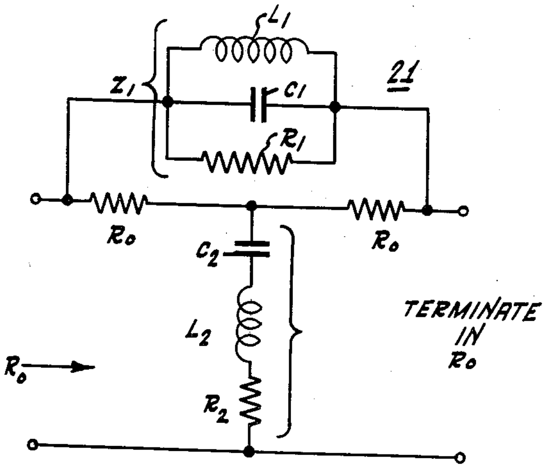
FIG. 4 is a schematic diagram of a preemphasis network applicable in a system operating in accordance with the present invention.

The preemphasis network 21, shown in detail in FIG. 4 of the drawing, may be inserted at any point of the circuitry ahead of the modulator of the transmitter. Also, the deemphasis network 28, shown more in detail in FIG. 5 of the drawing, may be inserted at any point in the circuitry following the discriminator. Practically, however, it is most convenient to build the networks as constant impedance networks and insert them in the coaxial cable feeding the composite video signal to the transmitter and in the coaxial video cable from the receiver.

Figure 5:
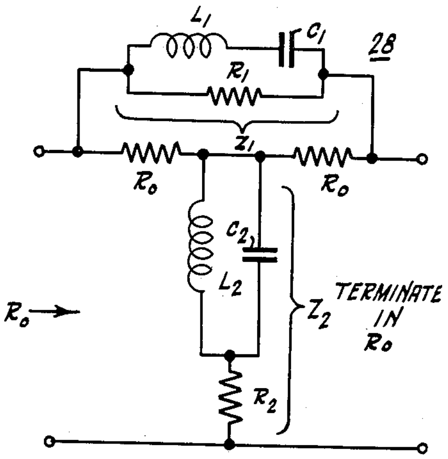
FIG. 5 is a schematic diagram of a deemphasis network applicable in a system operating in accordance with the present invention.
Figure 6:
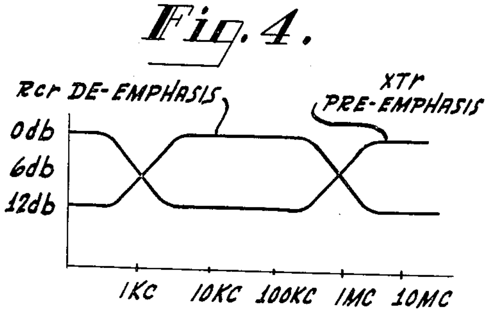
FIG. 6 is a graph showing the attenuation characteristics of a preemphasis network and a complementary deemphasis network.

Most conveniently, the networks shown by FIGS. 4 and 5 are bridged T networks in which the bridging element and the shunt arm of the T are inverse reactance arms. The insertion loss of the preemphasis network is given by:

$$L_p = 10\log_{10}\left[1+\frac{K^2-1}{1+K\left[\left(\frac{f}{f_r}-\frac{f_r}{f}\right)\Big/\left(b-\frac{1}{b}\right)\right]^2}\right]$$

and the insertion loss of the deemphasis network is given by:

$$L_d = 10\log_{10}\left[1+\frac{K^2-1}{1+K\left[\left(b-\frac{1}{b}\right)\Big/\left(\frac{f}{f_r}-\frac{f_r}{f}\right)\right]^2}\right]$$

where $K=\log_{10}^{-1}\dfrac{\text{max. loss}}{20}$ $b=f_r/f_b>1$ $f_r$=resonant frequency of $Z_1$ and $Z_2$ arms $f_b$=frequency where loss is one-half the maximum loss as measured in db $f$=any frequency The proper element values for the networks are obtained when the values of K, $f_r$, $f_b$, and $b$ are the same for the preemphasis and deemphasis networks, in which case the total insertion loss for the two networks in cascade reduces to a constant. The element values of $Z_1$, and $Z_2$ for the two networks may be calculated from:

*Preemphasis Network*

$$L_1=L_b\frac{K-1}{\sqrt{K}}\cdot\frac{b^2-1}{b^2}$$

$$L_2=L_b\frac{\sqrt{K}}{K-1}\cdot\frac{1}{b^2-1}$$

$$C_1=C_b\frac{\sqrt{K}}{K-1}\cdot\frac{1}{b^2-1}$$

$$C_2=C_b\frac{K-1}{\sqrt{K}}\cdot\frac{b^2-1}{b^2}$$

*Deemphasis Network*

$$L_1=L_b\frac{K-1}{\sqrt{K}}\cdot\frac{1}{b^2-1}$$

$$L_2=L_b\frac{\sqrt{K}}{K-1}\cdot\frac{b^2-1}{b^2}$$

$$C_1=C_b\frac{\sqrt{K}}{K-1}\cdot\frac{b^2-1}{b^2}$$

$$C_2=C_b\frac{K-1}{\sqrt{K}}\cdot\frac{1}{b^2-1}$$

and for both networks:

$R_1=R_0(K-1)$
$R_2=R_0/(K-1)$
$R_0$ is the given termination impedance for the networks.

$$L_b=\frac{R_0}{2\pi f_b}\qquad C_b=\frac{1}{2\pi f_b R_0}$$

What is claimed is:

1. A system for transmitting television signals by frequency modulation comprising a frequency modulation transmitter and a frequency modulation receiver in communication with said transmitter, means for supplying to said transmitter a composite video signal including 30 c.p.s. frame, 60 c.p.s. field, 15.75 kc. s. line sync signals and a 3.58 mc. s. color subcarrier in a frequency spectrum extending from a frequency below the frequency of said frame signals to a frequency substantially above the frequency of said color subcarrier, said means including a network providing attenuation of 12 db between half loss points located at 1 kc. s. and at 1 mc. s., in the composite video signal spectrum, and a complementary network supplied by the output of said receiver.

2. A method of transmitting television signals by frequency modulation comprising the steps of generating a composite video signal including a 30 c.p.s. frame frequency, a 60 c.p.s. field frequency, a 15,750 c.p.s. line sync frequency and a modulated color subcarrier having a nominal frequency of 3.58 mc. s., said video signal occupying a frequency spectrum extending from a frequency below the frequency of said frame signals to a frequency substantially above the frequency of said color subcarrier, attenuating a band of frequencies in the composite video signal spectrum extending from a frequency of 300 c.p.s. to a frequency of 3 mc. s., and frequency modulating a carrier wave by said attenuated composite video signal.

3. A method of transmitting and receiving television signals by frequency modulation comprising the steps of generating a composite video signal including a 30 c.p.s. frame frequency, a 60 c.p.s. field frequency, a 15,750 c.p.s. line sync frequency and a modulated color subcarrier having a nominal frequency of 3.58 mc. s., said video signal occupying a frequency spectrum extending from a frequency below the frequency of said frame signals to a frequency substantially above the frequency of said color subcarrier, attenuating a band of frequencies in the composite video signal spectrum extending from a frequency of 300 c.p.s. to a frequency of 3 mc. s., frequency modulating a carrier wave by said attenuated composite video signal, transmitting said carrier wave, demodulating said carrier wave at a location spaced from said place of transmission to recover said attenuated composite video signal, and attenuating said recovered composite video signal in a manner complementary to said first attenuation step.

4. A system for transmitting signals by frequency modulation of a carrier wave comprising a frequency modulation transmitter, a video signal source providing a composite video signal including a 30 c.p.s. frame frequency, a 60 c.p.s. field frequency, a 15,750 c.p.s. line sync frequency and a modulated color subcarrier having a nominal frequency of 3.58 mc. s., said video signal occupying a frequency spectrum extending from a frequency below the frequency of said frame signals to a frequency above the frequency of said color subcarrier, a filter network for attenuating a band of frequencies in the composite video signal spectrum extending from a frequency of 300 c.p.s. to a frequency of 3 mc. s., said transmitter having means for generating a carrier wave, and means for frequency modulating said carrier by said attenuated composite video signal.

5. A method of transmitting television signals by frequency modulation comprising the steps of generating a composite video signal including a 30 c.p.s. frame frequency, a 60 c.p.s. field frequency, a 15,750 c.p.s. line sync frequency and a modulated color subcarrier having a nominal frequency of 3.58 mc. s., said video signal occupying a frequency spectrum extending from a frequency below the frequency of said frame signals to a frequency substantially above the frequency of said color subcarrier, attenuating the frequencies in said spectrum to a maximum extent between 3 kc. and 300 kc. with zero attenuation below 300 c.p.s. and above 3 mc. s., and with said attenuation at one-half of maximum extent at 1 kc. s. and 1 mc. s.

References Cited in the file of this patent

UNITED STATES PATENTS 2,841,638 Rieke ................ July 1, 1958